United States Patent [19]
Sampsell et al.

[11] Patent Number: 6,113,239
[45] Date of Patent: Sep. 5, 2000

[54] PROJECTION DISPLAY SYSTEM FOR REFLECTIVE LIGHT VALVES

[75] Inventors: Jeffrey B. Sampsell; James M. Florence, both of Vancouver, Wash.

[73] Assignee: Sharp Laboratories of America, Inc., Camas, Wash.

[21] Appl. No.: 09/148,727

[22] Filed: Sep. 4, 1998

[51] Int. Cl.[7] .................................................. G03B 21/14
[52] U.S. Cl. .................................. 353/31; 353/20; 349/9
[58] Field of Search .................................. 353/20, 33, 31, 353/34, 38, 37, 30, 84, 81, 94; 349/9, 8, 5; 359/890, 492, 502, 501, 498

[56] References Cited

U.S. PATENT DOCUMENTS

| | | |
|---|---|---|
| 4,127,322 | 11/1978 | Jacobsen et al. . |
| 4,650,286 | 3/1987 | Koda et al. . |
| 4,836,649 | 6/1989 | Ledebuhr et al. . |
| 5,153,752 | 10/1992 | Kurematsu et al. .......................... 349/9 |
| 5,233,385 | 8/1993 | Sampsell . |
| 5,239,322 | 8/1993 | Takanashi et al. . |
| 5,321,448 | 6/1994 | Ogawa . |
| 5,374,968 | 12/1994 | Haven et al. ............................. 353/31 |
| 5,612,753 | 3/1997 | Poradish et al. . |
| 5,626,409 | 5/1997 | Nakayama et al. . |
| 5,648,860 | 7/1997 | Ooi et al. . |
| 5,658,060 | 8/1997 | Dove . |
| 5,826,959 | 10/1998 | Atsuchi .................................... 353/20 |

*Primary Examiner*—William Dowling
*Attorney, Agent, or Firm*—Robert D. Varitz, PC

[57] ABSTRACT

A projection display system for reflective light valves includes a light source for generating a light beam having RGB light components, wherein the red light component is p-polarized and the green and blue light components are s-polarized; a reflector structure having plural polarizing beam splitter and dichroic filters therein, wherein each PBS and DF reflects a preselected light component and transmits a different preselected light component, and a LCD panel for generating a light-component-specific image associated with each light component; and a projection lens for projecting an image combined from the light-component-specific images from the LCDs; wherein a light-component-specific image passes through one and only one PBS and through one and only one DF between the LCD and the projection lens.

15 Claims, 9 Drawing Sheets

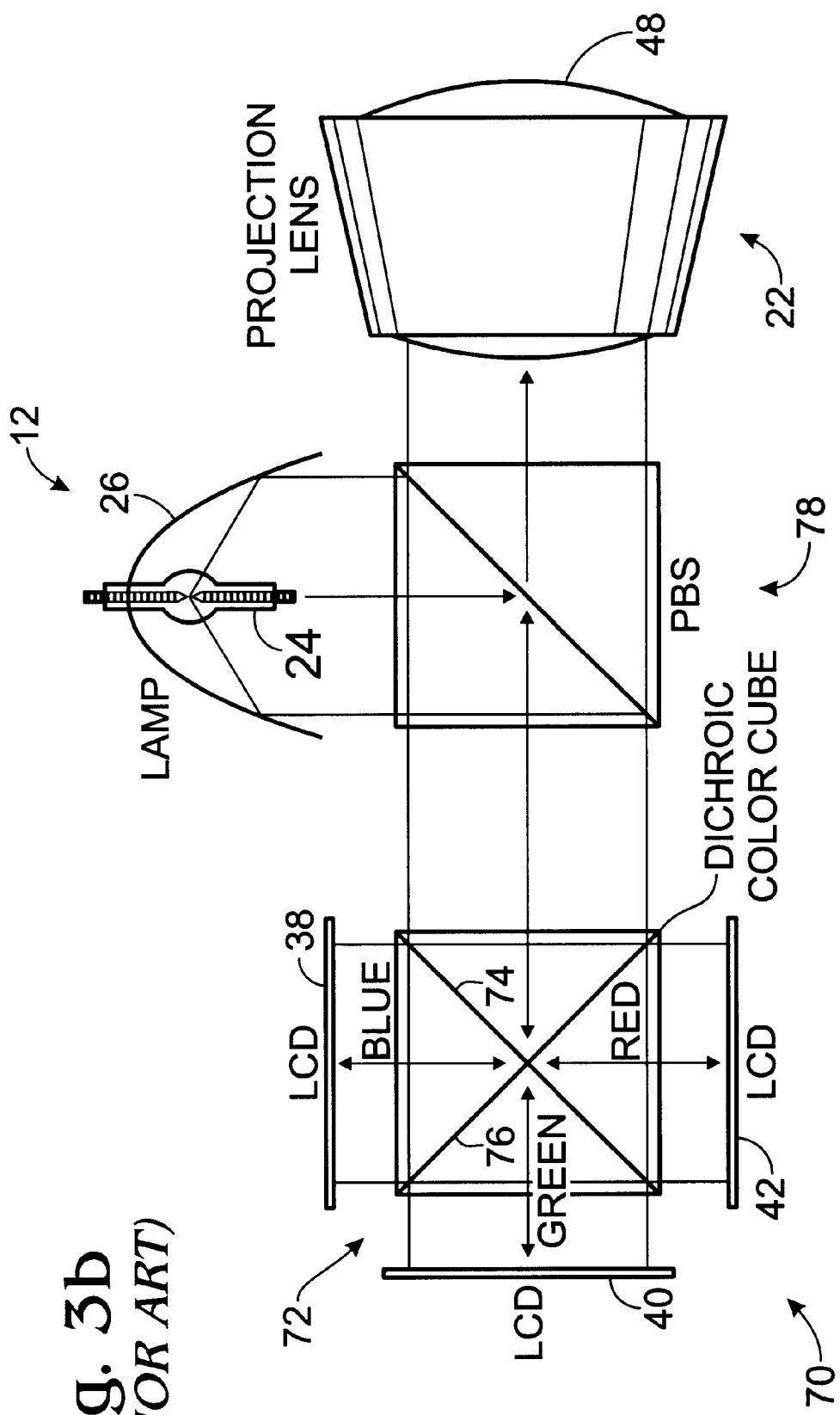
Fig. 3b *(PRIOR ART)*

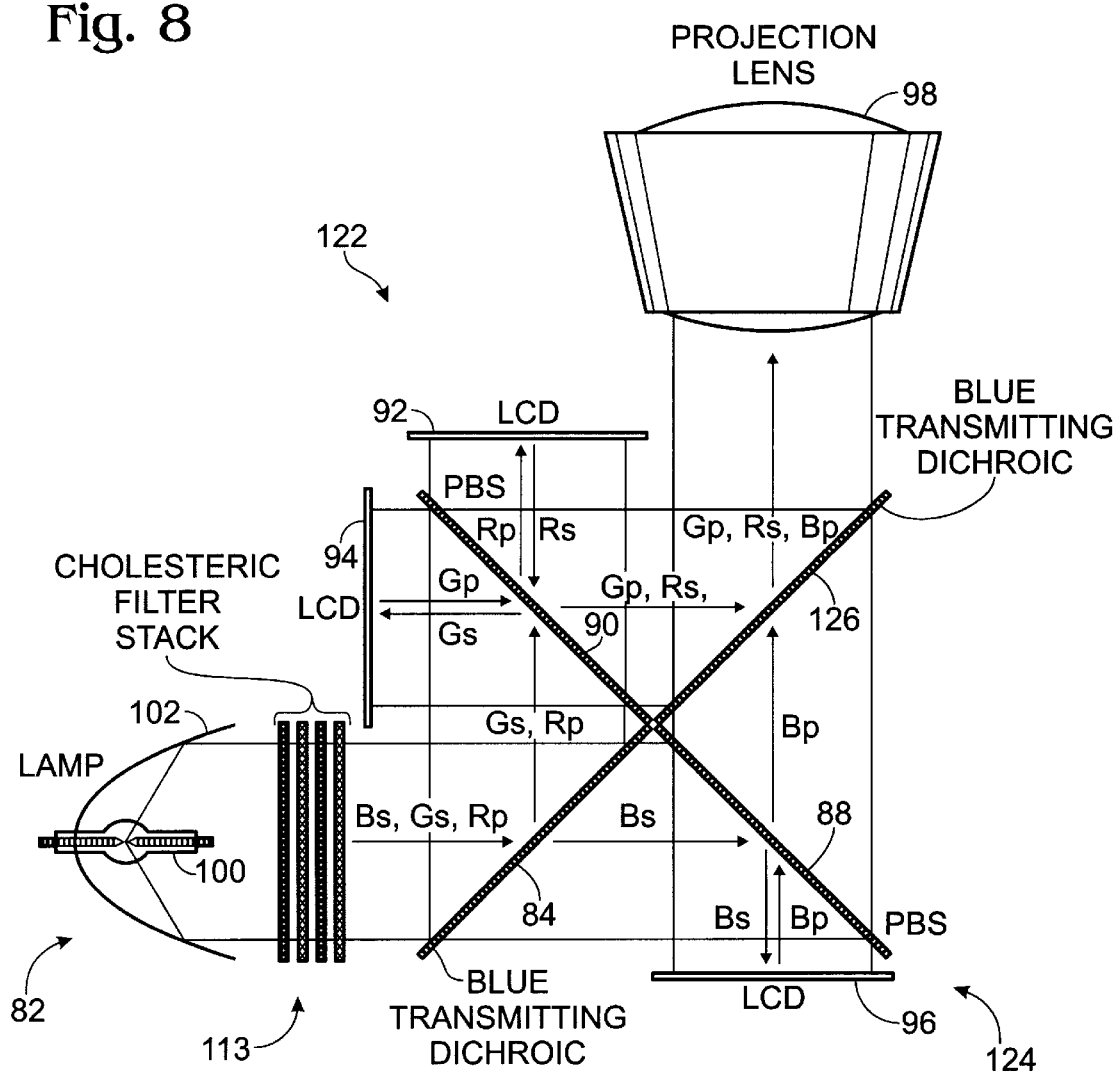

PROJECTION DISPLAY SYSTEM FOR REFLECTIVE LIGHT VALVES

FIELD OF THE INVENTION

This invention relates to projection display systems which use reflective spatial light modulators, and specifically, to such systems which incorporate reflective liquid crystal devices.

BACKGROUND OF THE INVENTION

The system shown in FIG. 1 illustrates the essential components of the optical portion of a projection display system having three reflective spatial light modulators in the form of liquid crystal display (LCD) panels, also referred to as liquid crystal light valves (LCLV). The prior art system, depicted generally at 10 includes a light source 12, an illumination mechanism for collecting the light and concentrating it onto the light valves, shown generally at 14, a polarizing mechanism for polarizing the light, if the light valves modulate via polarization effects, shown generally at 16, a splitting mechanism for splitting the illumination into three color bands to separately illuminate the three light valves, shown generally at 18, a recombining mechanism for recombining the three light distributions after reflecting from the light valves, shown generally at 20, and a projection mechanism for projecting the combined images onto a viewing screen, shown generally at 22.

Lamp 24 and lamp reflector 26 produce and concentrate the light for this system. A series of dichroic filters 28, 30 is used to split the light from the lamp into separate red, green, and blue components. The light in each of the three components, or channels, is then polarized with a polarizing beam splitter (PBS) 32, 34, 36, and illuminates three separate LCDs, 38, 40, 42. The LCDs selectively modify the polarization of the light reflected from them allowing some portion of the light to pass back through the PBS. A second series of dichroic filters, 44, 46, is used to recombine the modulated light distributions and pass them on to a projection lens 48 imaging all three LCDs onto the viewing screen.

The configuration shown in FIG. 1 is functional and has been used to implement projection display system products. However, the large number of components in this architecture is cumbersome, and necessitates a relatively large physical size of the system. The most serious drawback to these systems is the requirement of a large back working distance for the projection lens.

A single filter, or PBS plate, tilted at 45 degrees requires an optical path length equal to or greater than the active width of the LCD panel. It may be seen in FIG. 1 that two of the three channels, green and red, require a PBS and two dichroic filters. These channels require a minimum optical path length between the LCD and the projection lens of three times the active width of the LCD. The blue channel in FIG. 1 requires only one PBS and a single dichroic filter, but the path length must be equal to the other two channels for in-focus registration of all three images on the viewing screen. The actual optical path length for the projection lens must also account for the divergence of the light after reflecting off the LCD panel. This is a function of how fast the optical system is running, usually specified by the f/# of the optical system. The minimum distance referred to here is strictly valid only for systems of very high f/# and thus impractical due to low light throughput. However, for comparison with other systems this minimum figure is a good baseline. The only advantages of this architecture is the ability to optimize the color filtering with the interaction of multiple dichroic structures and the ability to optimize the PBS performance for the narrow band color channels. However, these advantages are relatively minor.

The most straightforward method of simplifying the projector architecture is to have the filter and beam splitter structures perform more than one function in the set of required system operations. System configuration 50, shown in FIG. 2, incorporates two of these simplifications. The first is the use of a single PBS 52 immediately after lamp 24, replacing the three PBS plates of the FIG. 1 system configuration. Single PBS 52 polarizes the broadband output of the lamp prior to the color splitting operation and thus functions as the amplitude modulation control mechanism for all three LCDs. This requires that the PBS function over the entire visible spectrum. The second simplification is to utilize the same set of dichroics to split the light into the three color channels and to recombine the reflected light prior to the projection optic. This requires that the dichroic filter passbands be carefully controlled since there are now only two filters 54, 56, to control the whole system colorimetry. The savings in system complexity is readily evident.

One system difficulty not addressed by the configuration in FIG. 2 is the reduction in the back working distance of the projection lens. The projection lens must still work over a distance that is a minimum of three times the active width of the LCD. A solution to this problem is found by recognizing that the operation of the dichroic filters is still the same even if the dichroic structures are crossed as shown in system 60 in FIG. 3a. This allows the back working distance to be reduced by 33% over the systems of FIGS. 1 or 2, to a minimum of twice the active width of the LCD. Unfortunately, crossing plate dichroics 62, 64, introduces a problem because the operation at the intersection of the two plates is usually disrupted by the thickness of the plates, producing a seam in the middle of the image, where the images of the three LCD panels are totally or partially obscured by the plate intersection.

The preceding problem is solved in system 70 of FIG. 3b by the introduction of a four piece color cube filter, shown generally at 72. Dichroic filters 74, 76 are deposited on the surfaces of the four cube segments and the pieces are then glued together to form a solid cube with the dichroics sealed in the interior across the cube diagonals. If properly assembled this arrangement eliminates most of the obstruction of the central crossover of the two dichroic layers. However, this assembly is precise and the color cube component is expensive because of the difficulty in assembly. FIG. 3b also shows the use of a polarizing beam splitter cube 78. This component is a common assembly for optical systems and is not an expensive addition due to the significantly less stringent assembly requirements.

As indicated in these system configurations, the state-of-the-art in system architectures for reflective LCDs includes several arrangements, each with particular advantages and disadvantages. A desired alternative is a system that has the small back working distance advantages of the systems shown in FIGS. 3a and 3b, without the costly addition of a precisely assembled crossed dichroic filter cube.

U.S. Pat. No. 4,127,322, to Jacobson et al., Nov. 28, 1978, is one of the oldest patents found covering any type of projection display and is fashioned around the optically addressed Hughes liquid crystal light valve (LCLV). A lamp output is polarized by a beam splitter and then divided into the three color paths by dichroic filters. This configuration is equivalent to the system in FIG. 2 of the prior art. The reference also includes an alternative embodiment in which an additional set of dichroic filters and three light valves are arranged to use the light normally discarded by the polarizer. This attempt to recover the unused portion of the light is intended to improve system throughput.

U.S. Pat. No. 4,650,286, to Koda et al., Mar. 17, 1987, and U.S. Pat. No. 4,836,649, to Ledebuhr, et al., Jun. 6, 1989, describe architectures for the reflective LCLVs that are essentially equivalent to the system of FIG. 1, with the exception that they use a separate projection lens for each of the three light valves.

U.S. Pat. No. 5,239,322, to Takanashi et al., Aug. 24, 1993, is another system designed originally for the optically addressed LCLV type light modulators. The system covered in this patent is easily be recognized as equivalent to the prior art architecture of FIG. 3b. In this system the LCLVs are illuminated with images indicated as write light distributions. CRTs are typically used to produce these write light distributions and are usually abutted directly to the corresponding light modulator.

U.S. Pat. No. 5,648,860, to Ooi et al., July 15, 1997, uses two dichroic plates to separate the light into the three color channels and to recombine the light reflected from the LCDs. The angles of the plates used in this configuration are not 45 degrees and are set to try to reduce the back working distance for the projection optics. The key invention of this patent appears to be the use of positive lens elements directly in contact with the LCD panels to collimate the incoming illumination and to converge the reflected light, and the use of "cone-like" prisms to affect the matched convergence of the illuminating light. In all other aspects this system is essentially the same as that of FIG. 2.

U.S. Pat. No. 5,658,060, to Dove, is a system having a set of external dichroic filters that separate the light into the three color paths. The light in each path is separately polarized before illuminating the light valves. The reflected light is recombined through a special prism arrangement, usually referred to as a Philips prism. The Philips prism is used to try to reduce the back working distance requirements of the projection lens. Although this system uses a prism for recombination, it is architecturally equivalent to the system in FIG. 1. The reference also describes another embodiment that uses a cube beam splitter for recombining the light output but continues to use separate dichroics to affect the initial split of the light into three color paths and to use separate PBSs for each light valve.

U.S. Pat. No. 5,621,486, to Doany et al., Apr. 15, 1997, describes a simple configuration for a three-panel projector. The system uses a Philips type prism to split the illuminating light and to recombine the reflections from the three LCDs. However, this setup uses a single cube polarizing beam splitter in front of the color splitting prism. This system is thus equivalent to the architecture of FIG. 3.

U.S. Pat. No. 5,233,385, to Sampsell, Aug. 3, 1993 and U.S. Pat. No. 5,612,753, to Poradish, et al., Mar. 18, 1997, describe projection systems designed for the TI digital micro-mirror device (DMD) light modulator. These references include system architectures for both single panel color field sequential systems and multiple panel systems. In the multiple panel systems that might be compared with the present invention a color splitting prism of the Philips type is used to perform the color separation and recombination and a total internal reflecting (TIR) prism is used to get light on and off of the DMDs. In this case the system looks essentially the same as that of FIG. 3b with a TIR prism used in place of the PBS cube.

References describing transmissive light modulators include U.S. Pat. No. 5,321,448, to Ogawa, Jun. 14, 1994, and U.S. Pat. No. 5,626,409, to Nakayama et al., May 6, 1997, the latter of which describes a system which is the transmissive equivalent of the system in FIG. 1. The light from the lamp is divided into the three-color paths by a set of dichroic filters. After passing through the three light valves, the modulated light distributions are recombined using a separate set of dichroic filters. The '448 reference uses a set of dichroic filters to divide the lamp output into the three-color paths, and a separate set of dichroic filters, in the form of a color cube prism, to recombine the modulated light. This later configuration is the most common architecture presently used for transmissive light valves.

SUMMARY OF THE INVENTION

A projection display system for reflective light valves includes a light source for generating a light beam having red-green-blue (RGB) light components, wherein the red light component is p-polarized and the green and blue light components are s-polarized; a reflector structure having plural polarizing beam splitters (PBS) and dichroic filters (DF) therein, wherein each PBS and DF reflects a preselected light component and transmits a different preselected light component, and a LCD panel for generating a light-component-specific image associated with each light component; and a projection lens for projecting an image combined from the light-component-specific images from the LCDs; wherein a light-component-specific image passes through one and only one PBS and through one and only one DF between the LCD and the projection lens.

An object of this invention is to provide a projection system for reflective liquid crystal light valves that has a small back working distance for the projection lens.

Another object of this invention is to provide a projection system for reflective liquid crystal light valves that has an projection path free from crossed dichroics obstructions.

Yet another object of this invention is to provide a projection system for reflective liquid crystal light valves that has a relatively simple configuration of the components that are used to split up and recombine the three color light distributions.

Another object of this invention is to provide a projection system for reflective liquid crystal light valves that is more compact than known projection systems.

A further object of this invention is to provide a projection system for reflective liquid crystal light valves that may be manufactured at a reduced cost compared to existing systems.

BRIEF DESCRIPTION OF THE DRAWINGS

FIG. 8 is a schematic representation of a second embodiment of a projection display system of the invention.

DETAILED DESCRIPTION OF THE PREFERRED EMBODIMENTS

Figure 4:
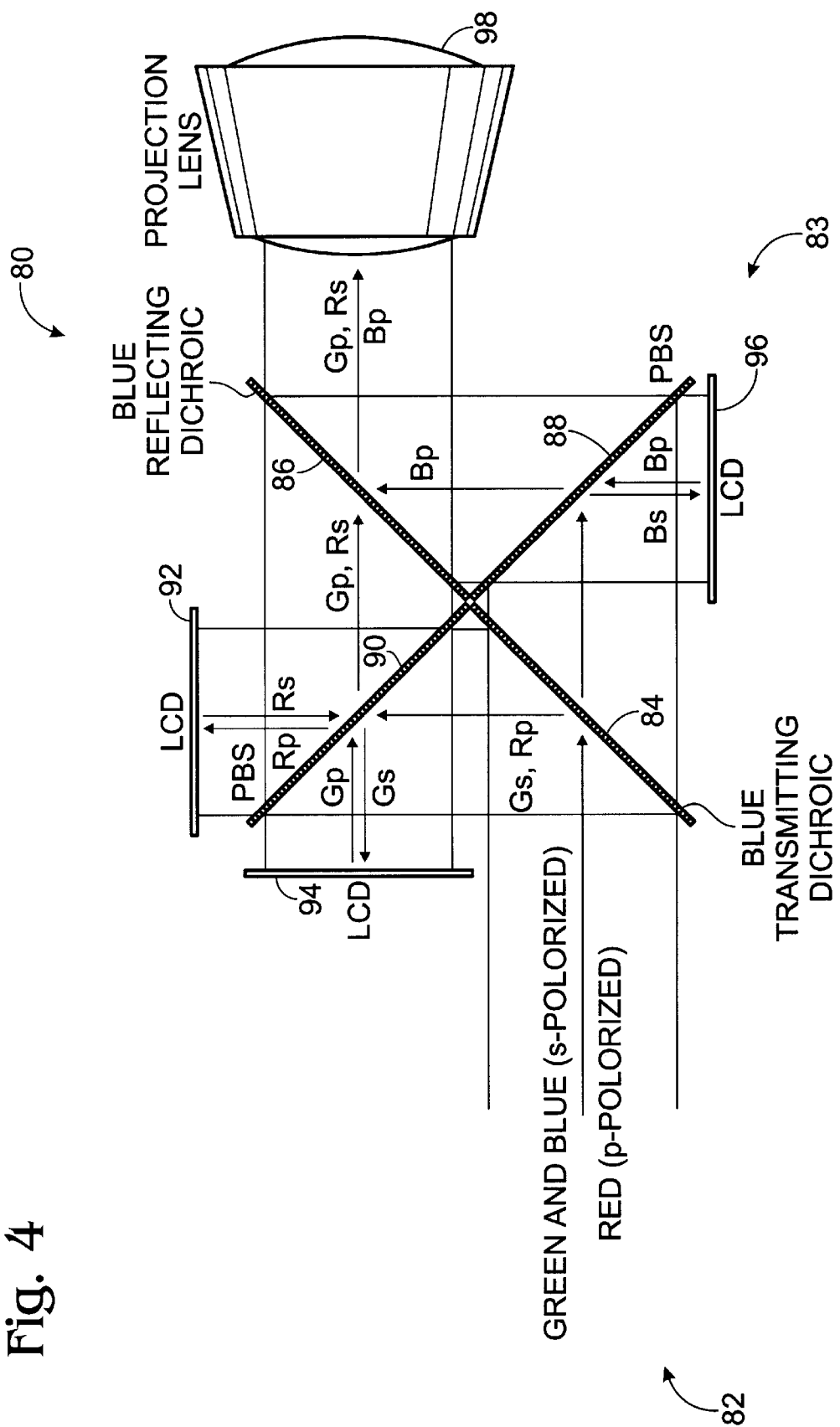
FIG. 4 is a schematic representation of the optical path of the projection system of the invention.

The projection display system of the invention is shown generally at 80 in FIG. 4. System 80 includes a light source 82 and a projection system 83. Projection system 83 includes two dichroic filters (DF) 84, 86, and two polarizing beam splitters (PBS) 88, 90, to split up the incoming white light from light source 82 into RGB components before directing each light beam component to a specific light valve, or liquid crystal display (LCD), 92, 94, 96. LCDs 92, 94, 96 each provide a light-component-specific image, which is illuminated by the light beam component and reflected from the face of the LCD, carrying a color image component. The color image components are then recombined, and the reflected light is directed to projection lens 98.

A requirement for proper operation of projection system 83 is that the input illumination is pre-filtered and polarized so that the green and blue distributions are s-polarized and the red distribution is p-polarized. As is known to those of skill in the art, s-polarized light has its electric field vector linearly polarized perpendicular to the plane of the figure and p-polarized light has its electric field vector linearly polarized in the plane of the figure. The pre-filtering mechanism will be described later herein.

DFs 84 and 86 are arranged in a substantially straight line within projection system 83, as are PBSs 88, 90. The DFs and PBSs are arranged to intersect their respective substantially straight lines adjacent the midpoints thereof in a normal relationship. Put another way, the optics are arranged in a substantially "X" shaped configuration, with the filters and beam splitters each joined adjacent an edge thereof. Although, in FIG. 4, it appears that there is an offset between DF 84 and DF 86, it will be appreciated that the reflective coatings are disposed on one side only of the filter, i.e., as viewed in FIG. 4, DF 84 is coated on its upper surface while DF 86 is coated on its lower surface. The coated surfaces line up in the "X" shaped configuration.

In projection system 83, the incoming light first encounters blue-transmitting dichroic filter 84. The s-polarized blue light is transmitted while the s-polarized green light and p-polarized red light are reflected. The blue light passes on to PBS 88 where, because it is s-polarized, it reflects to first LCD light valve 96, which is a blue light modulator. LCD 96 modulates the polarization of the light by rotating the direction of polarization in proportion to the electrical signals provided to the device. The reflected light is thus a combination of s-polarized and p-polarized light. When the reflected light returns to PBS 88, the s-polarized portion again reflects back toward the incoming illumination and the p-polarized portion is transmitted on to blue-reflecting dichroic 86. The blue light will reflect off second dichroic filter 86 and through projection lens 98, to an image display, such as a projection screen.

The green and red light that is reflected from first dichroic filter 84 propagates to second PBS 90. The p-polarized red light is transmitted through PBS 90 to second LCD 92, a red light modulator, while the s-polarized green light is reflected to third LCD 94, a green light modulator. LCDs 92, 94 modulate the light distributions, and after the reflected distributions return to PBS 90, only the p-polarized portion of the green light and the s-polarized portion of the red light pass over to blue-reflecting dichroic filter 86. The other portions of these two distributions are again returned toward the incoming illumination. Because dichroic filter 86 transmits both red and green, these two distributions are combined with the blue light from the other path and pass through projection lens 98 to the image display. Dichroic filter 86 acts as an image recombiner in this embodiment.

Figure 3A:
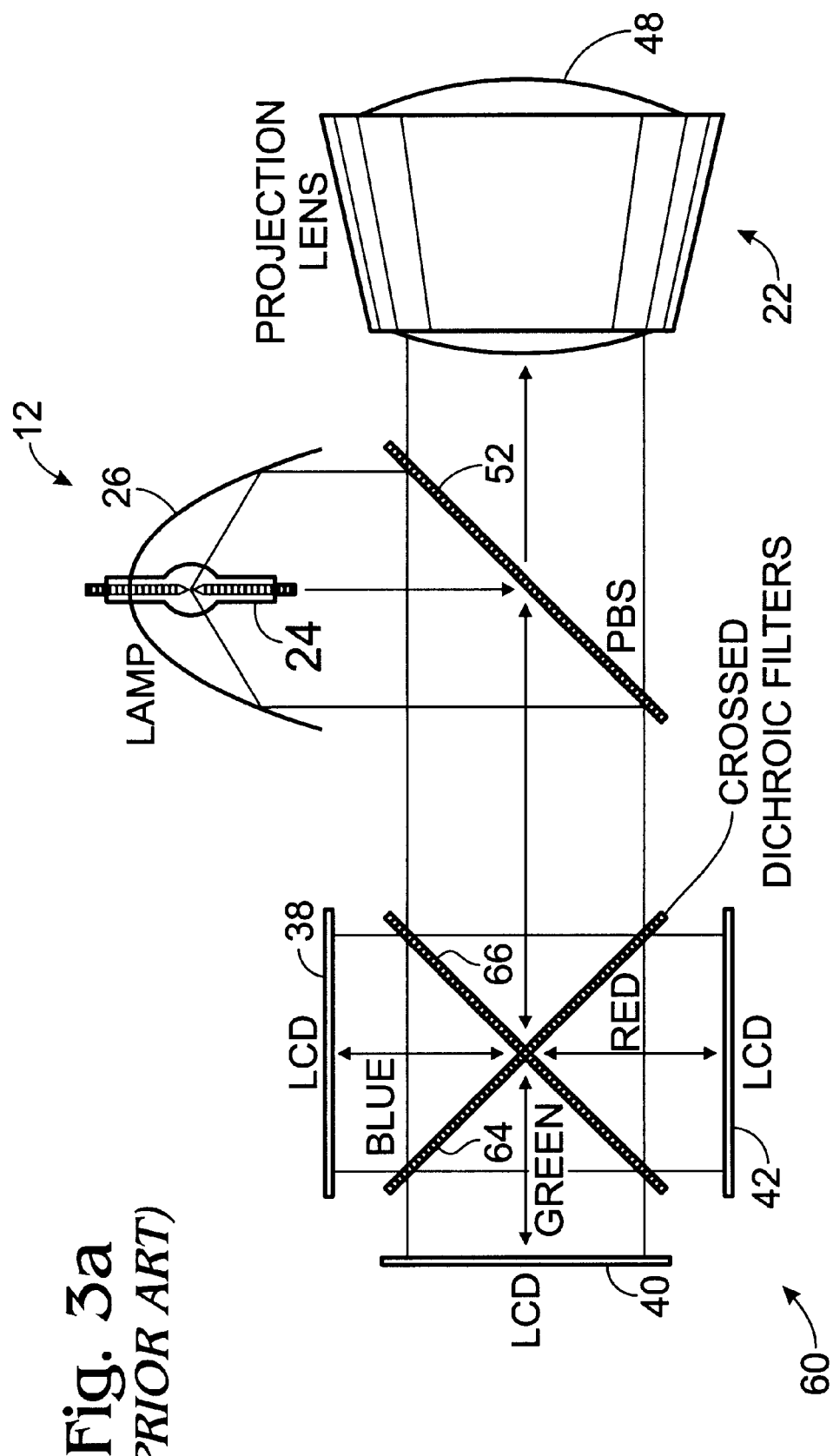

It may be seen in FIG. 4 that the light path from any LCD to projection lens 96 encounters one and only one PBS and one and only one dichroic filter. The optical path length has been reduced to a minimum of twice the active width of the LCD panel. Reflective LCD panels typically used in projection systems of the type described herein may vary in size from approximately 8 mm to 5 cm, diagonal measurement. The optical path length may be no less than approximately 1.6 cm to 10 cm. In this configuration, however, it is not necessary to cross any color filtering or polarizing structure in the optical path. There is, therefore, no obstruction of any kind in the projection path as in the configurations of FIG. 3. This represents a significant performance advantage. The configuration of FIG. 4 may also be implemented easily with thin plate dichroics and PBSs, which represents a significant cost advantage over a cube prism configuration.

Figure 5:
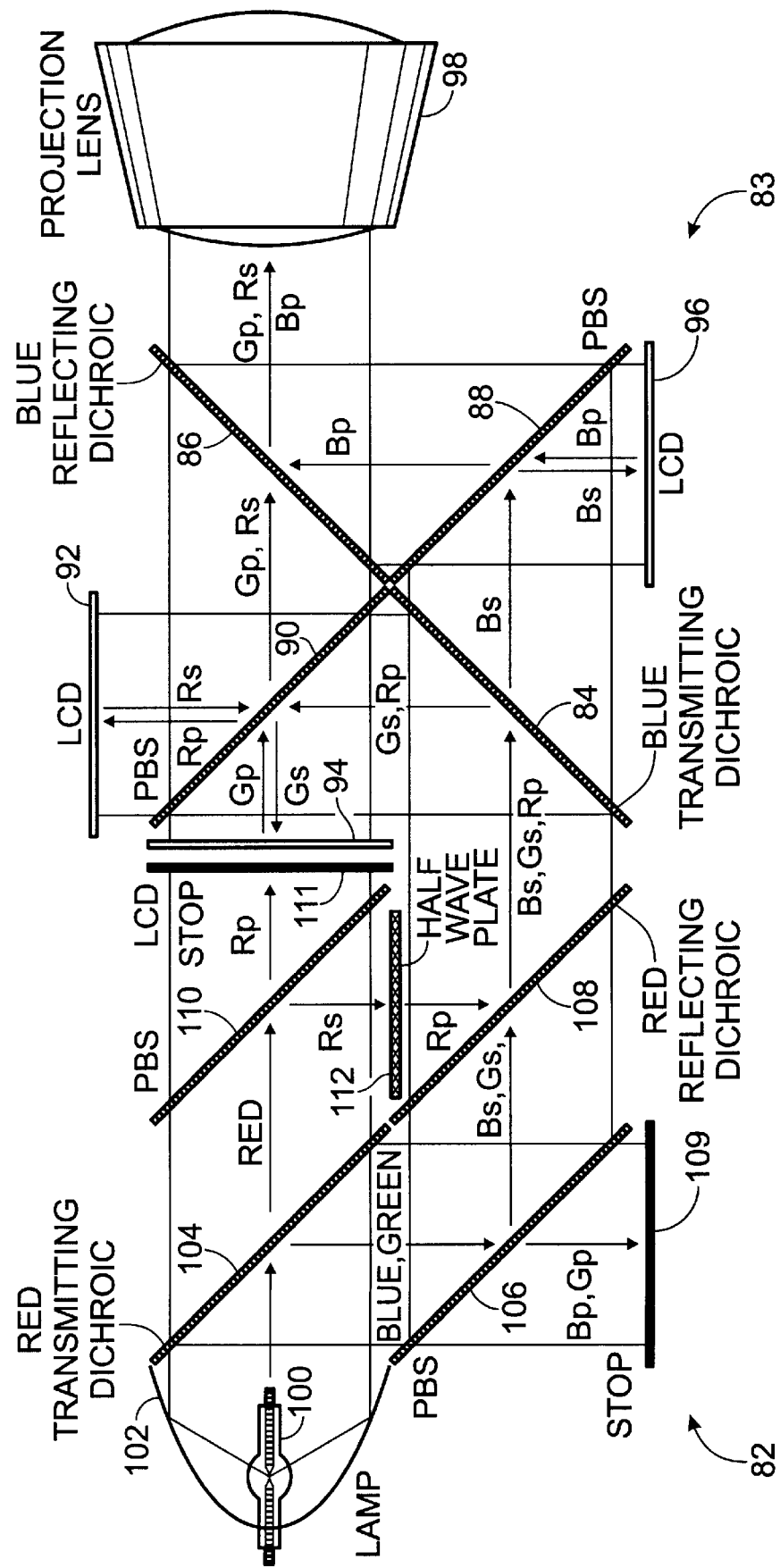
FIG. 5 is a schematic representation of a first embodiment of a light source and the projection system of the invention.

Projection display system 80, as shown in FIG. 5, includes projection system 83 of FIG. 4, and a specific embodiment of a pre-filtering illumination mechanism required to obtain the special combination of input light for the proper operation of this architecture. Light source 82 includes a lamp 100 and reflector 102, and a number of DFs and PBSs. An unpolarized white light beam from lamp 100 is incident on a red-transmitting dichroic filter 104. The blue and green light from the lamp reflect from filter 104 to a PBS 106. The s-polarized portions of the green and blue light then reflect off the PBS toward a red reflecting dichroic filter 108, while the p-polarized green and blue portions are absorbed by a stop 109. The two distributions that pass through dichroic filter 108 provide the s-polarized blue and green input to projection system 83. The unpolarized red light transmitted by dichroic filter 104 is polarized by PBS 110, and the s-polarized portion is reflected toward red-reflecting dichroic filter 108, while the p-polarized red portion is absorbed by stop 111. Before impinging the dichroic, the light passes through a half wave plate 112 that rotates its polarization direction by 90 degrees. The red light is now p-polarized, reflects off red-reflecting dichroic 108 and provides the p-polarized red light input to projection system 83.

Figure 1:
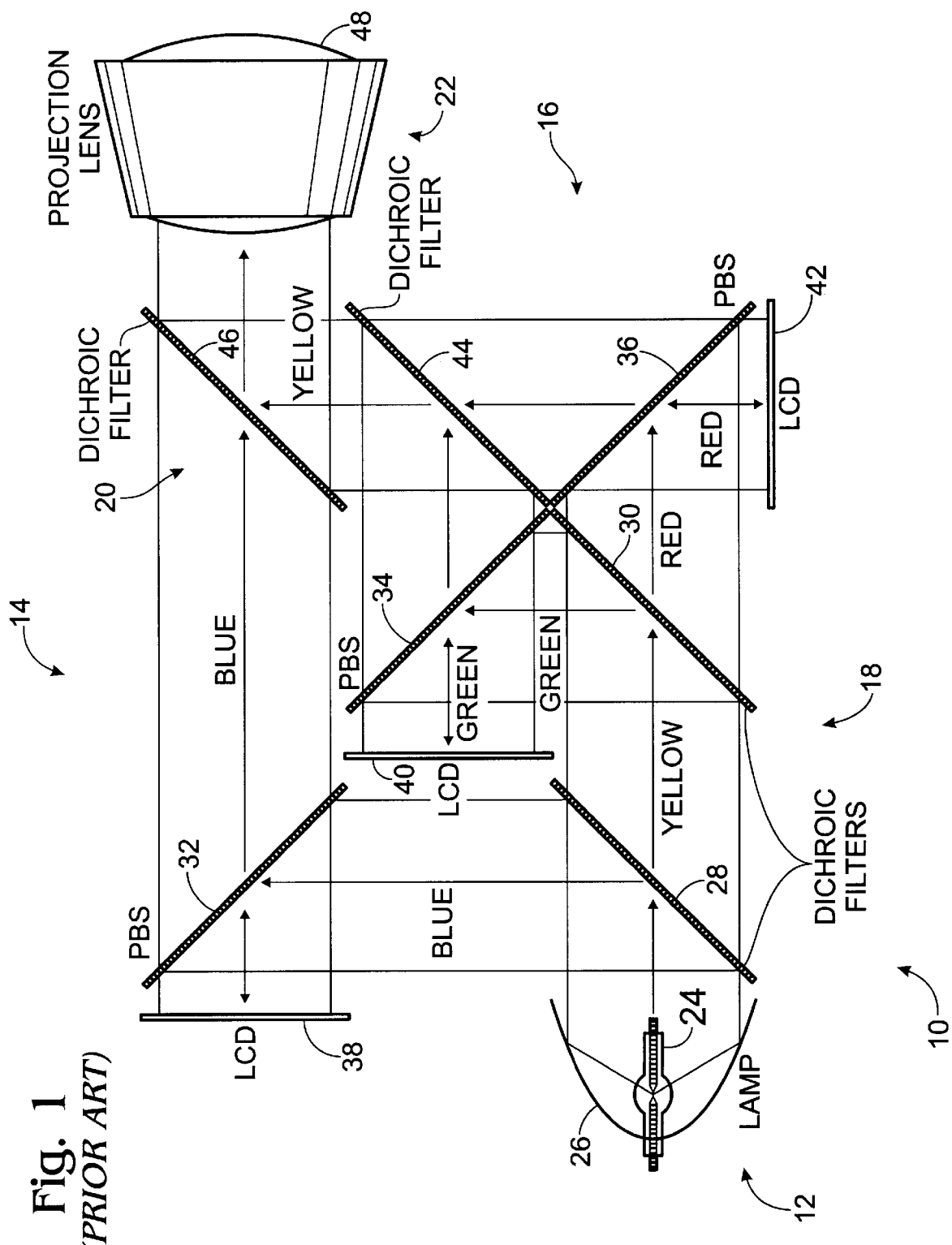
FIGS. 1–3 depict examples of prior art projection display systems.
Figure 2:
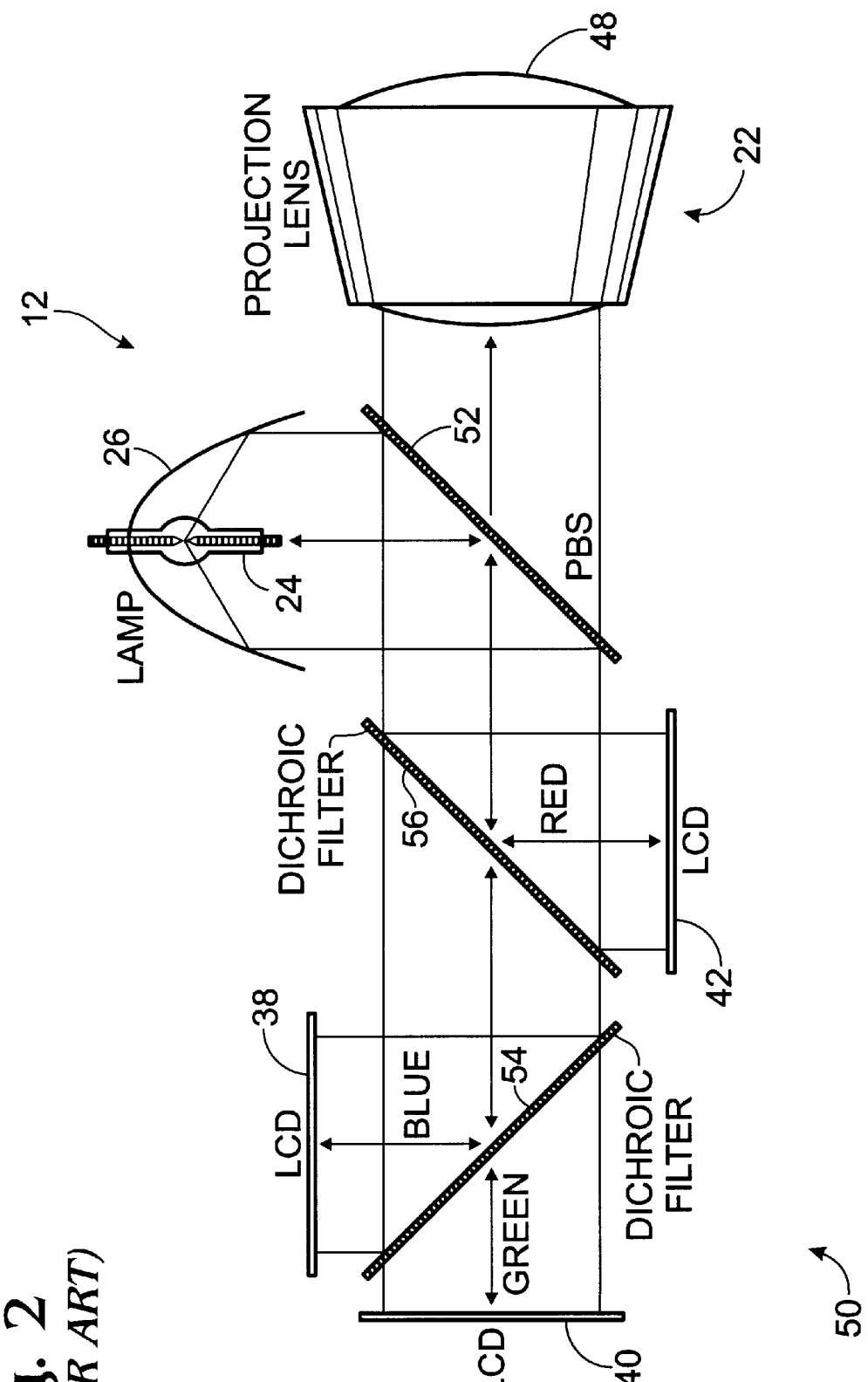

The pre-filtering configuration has the advantage of being implemented with fairly standard and inexpensive filtering components. One disadvantage of this arrangement is that the portions of the light distributions that pass through PBSs 106, 110 and hit stops 109, 111, respectively, are absorbed and lost. This light is half of the total light output from lamp 100. This level of light loss is typical of LCD projection systems that do not use polarization converters or recyclers. A second disadvantage is the additional size of the pre-filtering optics adding to the whole system. While the size of this complete system is smaller than the original reflective architecture described in FIG. 1, that uses simple plate filters and PBSs, it is quite a bit larger than the configurations of FIGS. 2 or 3.

Figure 6:
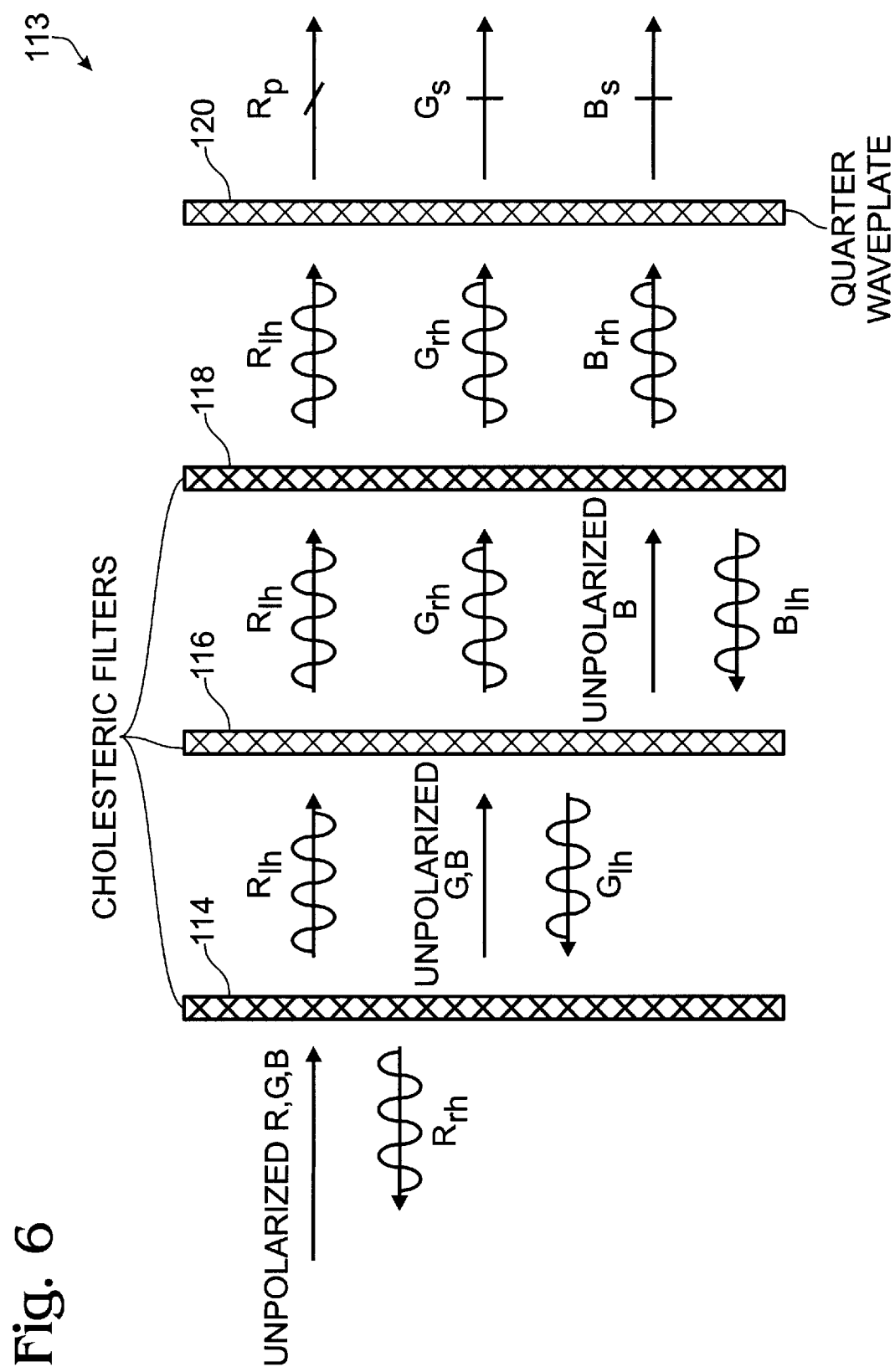
FIG. 6 is a schematic representation of a filter stack of the invention.
Figure 7:
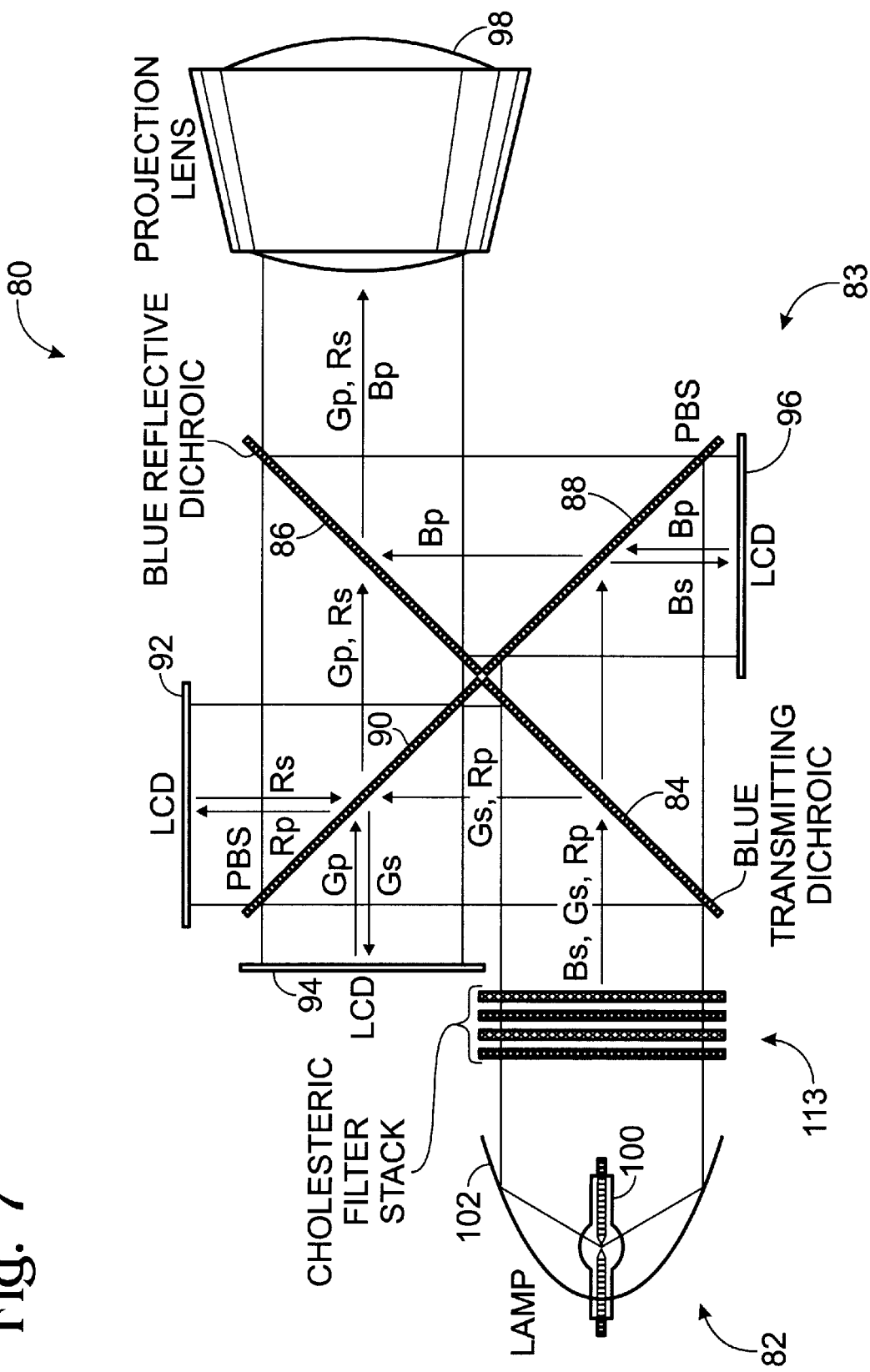
FIG. 7 is a schematic representation of a first embodiment of a projection display system of the invention.

A solution to the size problem may be found in another embodiment of the pre-filtering optics, as shown in FIGS. 6 and 7. Referring now to FIG. 6, an embodiment of a light source filter stack is shown generally at 113. Filter stack 113 uses specially designed cholesteric color filters 114, 116, 118. Cholesterics are chemical structures which have a spirally twisted molecular alignment. These materials have a special optical property that causes light of a wavelength that is equal to the pitch of the cholesteric spiral to be completely reflected if the light is circularly polarized, with the direction of circularity being the same as the direction of the cholesteric spiral. Thus, a cholesteric filter may be set up to reflect the left or right handed circular polarized portion of one color of light and to transmit the other handedness. The cholesteric does not affect any other color of light, transmitting both polarizations. The chemical structures of cholesterics may be manipulated to cause this special reflecting property to extend over a fairly broad range of wavelengths. The bands may be tuned to give just about any desired color passband for the portion of light that is reflected.

The pre-filtering operation of filter stack 113 is as follows: Unpolarized white light is incident on the stack from the left. First filter 114 is designed to reflect the right-handed circularly polarized portion of red light, and transmit the left-handed circularly polarized portion of the red light, and all polarizations of green and blue light. Second filter 116 is designed to reflect the left-handed polarization portion of green light. The right-handed polarization portion of green light is transmitted along with the left-handed polarized portion of the red light and the unpolarized blue light. Third filter 118 is designed to reflect the left-handed polarization portion of blue light, and transmits the right-handed polarization portion of blue and the rest of the incident light, i.e., the right-handed polarization portion of green light and the left-handed polarization portion of red light.

Circular polarization may be turned into linear polarization by passing the light through a quarter wave plate 120. Right-handed polarized light will exit wave plate 120 as linearly polarized with the direction of polarization at +45 degree to the crystalline optic axis of the wave plate material. Left-handed polarized light will also exit the wave plate linearly polarized, but the direction will be at –45 degrees to the crystalline axis. Thus with proper orientation of the wave plate axis, the right-hand polarized green and blue light will exit as s-polarized and the left-hand polarized red light will exit as p-polarized. This is the desired input to the imaging portion of the projection architecture.

The system shown in FIG. 7 uses pre-filtering stack 113 as part of light source 82 directly after lamp 100 to implement complete projection display system 80. System 80 is significantly smaller than the arrangement made with more conventional components in FIG. 5. The smaller size is the main advantage of this embodiment. This configuration has the same light loss problem as that of FIG. 5 because the cholesterics reflect half of the unpolarized light in their passband. This is again typical in many LCD projectors. Another disadvantage is the relative immaturity of the cholesteric materials. It is not clear at this point if the filtering materials will be as efficient or as durable as the dielectric stack materials used in dichroic filters and in PBSs. The system of FIG. 7 is a preferred embodiment if those questions may be satisfactorily answered.

The embodiment of projection system 83 of system 80 is the preferred embodiment. There are, however, alternative methods of arranging the color and polarization distributions. As an example, if the first dichroic (84) in FIG. 4 is changed to red-transmitting and the second dichroic (86) is changed to red-reflecting, then the pre-filter must polarize green and red light with s-polarization and blue with p-polarization. In this case, the roles of LCD 92 and LCD 96 in modulating the red and blue light distributions are reversed, but in all other respects the system is equivalent. It is, however, undesirable to set this type of system up with the dichroics being green-reflecting and green-transmitting, which will have LCD 96 modulating the green light. Green dichroic filters have two band edges in the visible spectrum—one separating red and green and the other separating blue and green. The position of the band edges is highly dependent on the polarization of the light. If green dichroics are used, either red or blue light will have to be polarized in the opposite state from the green light and the filtering at the band edge between the two differing polarization states will be poorly controlled. In the system shown in FIG. 4, using blue dichroics, the band edges of both filters separate blue and green. Both of these light distributions have the same polarization when they are split apart by the first, blue-transmitting dichroic, and when they are recombined by the second, blue-reflecting dichroic. The filtering at the band edge in both filters may therefore be well controlled. The same is true if red dichroics are used.

Projection display system 122, depicted in FIG. 8, includes a projection system 124 having, in addition to the components of projection system 83, a blue-transmitting dichroic filter 126, located prior to projection lens 98, which replaces blue-reflecting filter 86 shown in FIG. 7. The result is to direct the recombined light distributions out of projection system 124 at ninety degrees from that of projection system 83 of FIG. 7. This alternative embodiment may offer packaging advantages for some products. It should be noted that the band edge of first blue-transmitting filter 84 in FIG. 8 is used to separate s-polarized blue and green light, while the second blue transmitting filter is used to recombine p-polarized blue and green light. For reasons mentioned in the previous paragraph, these are not identical filters.

Thus, a projection display system for reflective light valves, and several variations thereof have been disclosed. Although a preferred embodiment of the invention, and several variations thereof, have been disclosed, it will be appreciated that further variations and modifications thereof may be made without departing from the scope of the invention as defined in the appended claims.

We claim:

1. A projection display system for reflective light valves comprising:

a light source for generating a light beam having red-green-blue (RGB) light components;

a projection system having two polarizing beam splitters and two dichroic filters therein, wherein each polarizing beam splitter and dichroic filter reflects a preselected light component and transmits a different preselected light component, and a LCD panel for generating a light-component-specific image associated with each light component; and a projection lens for projecting an image combined from the light-component-specific images from the LCDs; wherein each light-component-specific image interacts with one and only one polarizing beam splitter and interacts with one and only one dichroic filter between the LCD and the projection lens.

2. The system of claim 1 wherein said light source includes a lamp and a filter stack having a cholesteric color filter mechanism located between said lamp and said projection system for pre-filtering said light beam to transmit red p-polarized light, green s-polarized light and blue s-polarized light.

3. The system of claim 2 wherein said filter stack includes, seriatim, a first filter constructed and arranged to reflect a right-handed circularly polarized portion of said red light component, to transmit a left-handed circularly polarized portion of said red light component and to transmit all of said green and blue light components; a second filter constructed and arranged to reflect a left-handed circularly polarized portion of said green light component, to transmit a right-handed circularly polarized portion of said green light component and to transmit a left-handed circularly polarized portion of said red light and said blue light components; and a third filter constructed and arranged to reflect a left-handed circularly polarized portion of said blue light component, to transmit a right-handed circularly polarized portion of said blue light component, to transmit a right-handed circularly polarized portion of said green light component, and to transmit a left-handed circularly polarized portion of said red light component.

4. The system of claim 3 which further includes a quarter-wave plate to convert the circularly polarized light components into linearly polarized light components.

5. The system of claim 1 wherein said polarizing beam splitters are arranged in a substantially straight line in said projection system, and wherein said dichroic filters are arranged in a substantially straight line in said projection system, and wherein said dichroic filters are normal to said polarizing beam splitters and arranged to intersect adjacent a mid-point of said substantially straight lines.

6. The system of claim 5 wherein said light beam from said light source impinges on a blue-transmitting dichroic filter at substantially 45 degrees, then impinges on a polarizing beam splitter at substantially 45 degrees, then impinges on an LCD panel along a direction normal to the plane of said LCD panel, having said light-component-specific image displayed thereon, and is reflected therefrom carrying a color image component, then impinges a polarizing beam splitter at substantially 45 degrees, then impinges a blue-reflecting dichroic filter at substantially 45 degrees prior to transitting said projection lens.

7. The system of claim 5 wherein said light beam from said light source impinges on a blue-transmitting dichroic filter at substantially 45 degrees, then impinges on a polarizing beam splitter at substantially 45 degrees, then impinges on an LCD panel along a direction normal to the plane of said LCD panel, having said light-component-specific image displayed thereon, and is reflected therefrom carrying a color image component, then impinges a polarizing beam splitter at substantially 45 degrees, then impinges a blue-transmitting dichroic filter at substantially 45 degrees prior to transitting said projection lens.

8. The system of claim 1 wherein said light source includes a lamp for generating said light beam and a pre-filtering illumination mechanism located between said lamp and said projection system for pre-filtering said light beam to provide a red p-polarized light component, a green s-polarized light component and a blue s-polarized light component to said projection system, wherein said pre-filtering illumination mechanism includes:

a red-transmitting dichroic filter, a pair of polarizing beam splitters, a pair of light absorbing stops, a half-wave plate, and a red-reflecting dichroic filter;

wherein said light beam impinges said red-transmitting dichroic filter, wherein said light beam is split into a transmitted red light component and reflected green light and blue light components; said reflected green and blue light components impinge on a polarizing beam splitter, which reflects a green s-polarized light component and said blue light s-polarized component, wherein said green s-polarized light component and said blue light s-polarized component impinge said red-reflecting dichroic filter, which transmits said green s-polarized light component and said blue s-polarized light component to said projection system; and wherein said transmitted red light component impinges another polarizing beam splitter, which reflects a red s-polarized light component through said half-wave plate, which changes said red s-polarized light component to a red p-polarized light component, which red p-polarized light component impinges said red-reflecting dichroic filter and is reflected to said projection system.

9. A projection display system for reflective light valves comprising:

a light source for generating a light beam having red-green-blue (RGB) light components, wherein the red light component is p-polarized and the green and blue light components are s-polarized;

a projection system having plural polarizing beam splitter and dichroic filters therein, wherein each polarizing beam splitter and dichroic filter reflects a preselected light component and transmits a different preselected light component, and a LCD panel for generating a light-component-specific image associated with each light component, wherein said polarizing beam splitters and said dichroic filters are arranged in a substantially "X" shaped configuration, wherein said dichroic filters are normal to said polarizing beam splitters and arranged to intersect adjacent an edge thereof; and a projection lens for projecting an image combined from the light-component-specific images from the LCDs; wherein each light-component-specific image interacts with one and only one polarizing beam splitter and interacts with one and only one dichroic filter between the LCD and the projection lens.

10. The system of claim 9 wherein said light source includes a lamp and a filter stack having a cholesteric color filter mechanism located between said lamp and said projection system for pre-filtering said light beam.

11. The system of claim 10 wherein said filter stack includes, seriatim, a first filter constructed and arranged to reflect a right-handed circularly polarized portion of said red light component, to transmit a left-handed circularly polarized portion of said red light component and to transmit all of said green and blue light components; a second filter constructed and arranged to reflect a left-handed circularly polarized portion of said green light component, to transmit a right-handed circularly polarized portion of said green light component and to transmit a left-handed circularly polarized portion of said red light and said blue light components; and a third filter constructed and arranged to reflect a left-handed circularly polarized portion of said blue light component, to transmit a right-handed circularly polarized portion of said blue light component, to transmit a right-handed circularly polarized portion of said green light component, and to transmit a left-handed circularly polarized portion of said red light component.

12. The system of claim 11 which further includes a quarter-wave plate to convert the circularly polarized light components into linearly polarized light components.

13. The system of claim 12 wherein said light beam from said light source impinges on a blue-transmitting dichroic filter at substantially 45 degrees, then impinges on a polarizing beam splitter at substantially 45 degrees, then impinges on an LCD panel along a direction normal to the plane of said LCD panel, having said light-component-specific image displayed thereon, and is reflected therefrom carrying a color image component, then impinges a polarizing beam splitter at substantially 45 degrees, then impinges a blue-reflecting dichroic filter at substantially 45 degrees prior to transitting said projection lens.

14. The system of claim 12 wherein said light beam from said light source impinges on a blue-transmitting dichroic filter at substantially 45 degrees, then impinges on a polarizing beam splitter at substantially 45 degrees, then impinges on an LCD panel along a direction normal to the plane of said LCD panel, having said light-component-specific image displayed thereon, and is reflected therefrom carrying a color image component, then impinges a polarizing beam splitter at substantially 45 degrees, then impinges a blue-transmitting dichroic filter at substantially 45 degrees prior to transitting said projection lens.

15. The system of claim 9 wherein said light source includes a lamp for generating said light beam and a pre-filtering illumination mechanism located between said lamp and said projection system for pre-filtering said light beam to provide a red p-polarized light component, a green s-polarized light component and a blue s-polarized light component to said projection system, wherein said pre-filtering illumination mechanism includes:

a red-transmitting dichroic filter, a pair of polarizing beam splitters, a pair of light absorbing stops, a half-wave plate, and a red-reflecting dichroic fitter;

wherein said light beam impinges said red-transmitting dichroic filter, wherein said light beam is split into a transmitted red light component and reflected green light and blue light components; said reflected green and blue light components impinge on a polarizing beam splitter, which reflects a green s-polarized light component and said blue light s-polarized component, wherein said green s-polarized light component and said blue light s-polarized component impinge said red-reflecting dichroic filter, which transmits said green s-polarized light component and said blue s-polarized light component to said projection system; and wherein said transmitted red light component impinges another polarizing beam splitter, which reflects a red s-polarized light component through said half-wave plate, which changes said red s-polarized light component to a red p-polarized light component, which red p-polarized light component impinges said red-reflecting dichroic filter and is reflected to said projection system.

* * * * *